May 20, 1969  A. J. ZAJAC ET AL  3,445,064

WELDING GUN WATER SEAL

Filed Aug. 9, 1967

Inventors
Anthony J. Zajac
Edward J. Hahn
By Whule, Whule, House & Clemency
Attorneys

United States Patent Office 3,445,064
Patented May 20, 1969

---

3,445,064
WELDING GUN WATER SEAL
Anthony J. Zajac, Mukwonago, and Edward J. Hahn, Milwaukee, Wis., assignors to American Welding & Engineering Co., Inc., Milwaukee, Wis., a corporation of Wisconsin
Filed Aug. 9, 1967, Ser. No. 659,482
Int. Cl. B05b 7/06, 15/00; B23k 9/00
U.S. Cl. 239—132.3                            2 Claims

ABSTRACT OF THE DISCLOSURE

Disclosed herein is a seal arrangement for the water supply and water discharge tubes of a water jacket of a welding gun nozzle. The co-axially aligned water inlet and outlet tubes extend into tube apertures in the insulator which separates the nozzle from the welding gun head. The tube apertures have annular recesses or counterbores on each side of the insulator to receive O-rings located on the water tubes. The O-rings are compressed in assembly to seal the water tubes to the insulator.

Summary of invention

The invention provides an improved water seal for the water supply and water removal tubes connected to the water jacket of a welding gun gas nozzle. Problems have been encountered with the use of conventional gaskets to seal these tubes and prevent leakage. Continuous tightening of the union nut securing the gas nozzle of the welding gun head assembly is required to compress the gaskets and maintain a seal. This results in thread wear or stripping of the threads on the union nut. The seal arrangement of the invention utilizes small O-rings which are located on the water inlet and outlet tubes and which are received in annular recesses or counterbores in the insulator which separates the gas nozzle from the welding gun head. The O-rings are compressed axially and expanded radially to seal the tubes in the insulator apertures in which the tubes extend. The relatively small area of the O-rings as compared with the large gaskets conventionally used, provides a seal which requires less torque and stress on the union nut to compress the O-rings and create a water seal. The seal is substantially permanent and it is unnecessary to repeatedly increase the pressure exterted by the nut on the gasket to maintain a water tight seal.

Further objects and advantages of the invention will become apparent from the following description and accompanying drawings.

Drawings

Detailed description

Figure 1:
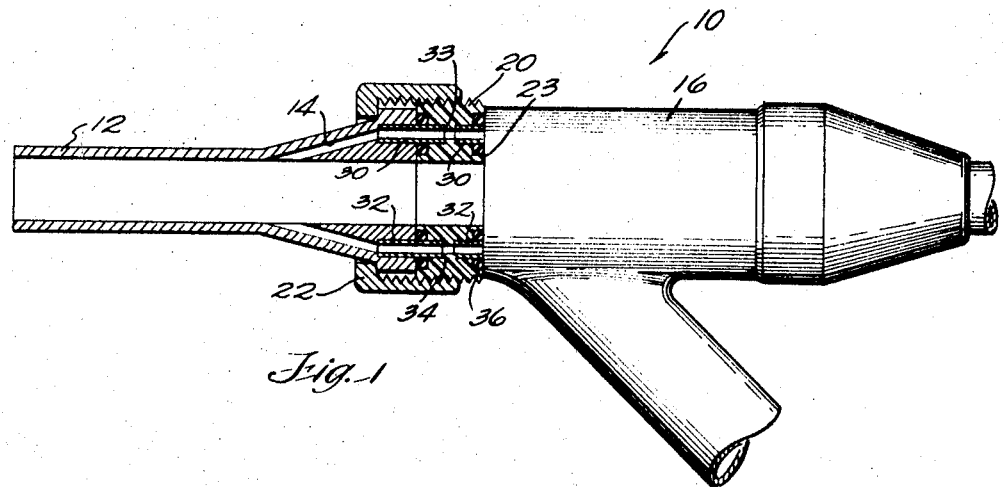
FIGURE 1 is a view partially in vertical cross section and partly in side elevation of a welding gun embodying the invention.
Figure 2:
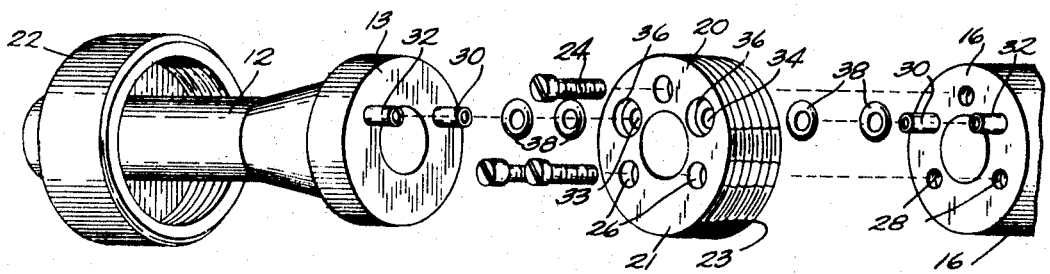
FIGURE 2 is a fragmentary exploded view of the welding gun shown in FIGURE 1.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Welding gun 10 has a gas nozzle 12 and a head asembly 16. The gas nozzle is separated and spaced from the head asembly 16 by an annular heat resistant insulator 20 which is threaded to receive a union nut 22. The insulator 20 is secured to the head 16 by bolts 24 which extend through countersunk apertures 26 in insulator 20 and are threaded into tapped apertures 28 in head 16.

Cooling water is supplied to the water jacket 14 in nozzle 12 through axially aligned inlet tubes 30, one tube 30 being located on the head assembly 16 and the other tube 30 on the nozzle 12. The circulating water is removed through axially aligned tubes 32 respectively located on the head assembly 16 and nozzle 12. Head insulator 20 is provided with through apertures 33, 34 into which the ends of the respective tubes 30, 32 interfit.

In accordance with the invention there is provided a seal arrangement or construction to seal the water inlet and outlet tubes to prevent water leakage. The sealing arrangement includes annular recesses or counterbores 36 about the bores 33, 34 and in the faces 21, 23 of the insulator 20, and elastomeric packing or O-rings 38 in the counterbores 36.

The O-rings 38 have an inside diameter slightly less than the diameter of the tubes 30, 32 so that a slight radial expansion is required to project the O-rings 38 over these tubes. The O-rings 38 have a diameter slightly less than the diameter of the counterbores 36 and an axial dimension or thickness slightly larger than the depth or axial length of the counterbores 36 to permit expansion radially and compression axially of the O-rings 38 when the nozzle 12 and insulator 20 are assembled on the head 16.

In assembly an O-ring 38 is placed over each of the tubes 30, 32 on the head. The insulator 20 is secured to the head by bolts 24 which are tightened to compress the O-rings 38 between the head 16 and face 23 of the insulator 20. An O-ring 38 is also placed on each tube 30, 32 on the gas nozzle 12 and the union nut 22 tightened until face 13 of the nozzle 12 is secured against face 21 of the insulator, thus compressing the O-rings 38 to create a seal.

The use of the relatively small diameter O-rings as compared with the larger prior art gaskets which approximate the size of face 13 requires less torque to tighten the union nut 22 and create the necessary pressure to compress the O-rings axially and expand them radially. In the disclosed device the pressure of the nut 22 is concentrated on the small O-rings. Thus, a fluid seal can be maintained in the area of the head insulator without need for continually tightening the union nut 22 to maintain the greater pressure required to compress a gasket having a larger area. Inasmuch as the seal is maintained at lower pressure, thread wear and stripping of threads on the union nut which commonly occurred with the use of large gaskets is eliminated.

We claim:

1. In a welding gun including a head assembly, a gas nozzle, a water jacket in the nozzle, axially aligned water inlet and outlet tubes in the head asseembly and nozzle, an insulator located between said head assembly and said nozle, said insulator having tube apertures for receiving said water tubes of said nozzle and said head assembly, said insulator being threaded to receive a union nut to secure said nozzle to said head assembly, the improvement to seal said inlet and outlet tubes to said insulator and comprising counterbores in said insulator about said tube apertures and O-rings located on each of said tubes and within said counterbores, said counterbores and said rings being of such dimensions that said rings are compressed axially and radially to afford fluid seals at each of the water tubes when said welding gun is assembled under pressure of said union nut.

2. The device of claim 1 wherein said O-rings have an outside diameter slightly less than the diameter of said counterbores and said counterbores have a depth less than the axial dimension of said O-rings.

References Cited

UNITED STATES PATENTS

| 3,285,631 | 11/1966 | Stolpmann | 285—354 |
| 2,451,422 | 10/1948 | Wagner | 219—75 X |

M. HENSON WOOD, Jr., *Primary Examiner.*

B. BELKIN, *Assistant Examiner.*

U.S. Cl. X.R.

219—130; 239—419, 422, 424; 285—135